(12) United States Patent
Marshall et al.

(10) Patent No.: US 7,123,265 B2
(45) Date of Patent: Oct. 17, 2006

(54) METHOD AND APPARATUS FOR ADDING REAL-TIME PRIMITIVES

(75) Inventors: Carl S. Marshall, Portland, OR (US); Adam T. Lake, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1419 days.

(21) Appl. No.: 09/741,599

(22) Filed: Dec. 19, 2000

(65) Prior Publication Data
US 2002/0075273 A1    Jun. 20, 2002

(51) Int. Cl.
*G06T 15/00* (2006.01)
(52) U.S. Cl. .................. 345/503; 345/423; 345/581
(58) Field of Classification Search ............... 345/418, 345/419, 423, 581, 424, 633, 503, 428, 582
See application file for complete search history.

(56) References Cited

U.S. PATENT DOCUMENTS 5,255,359 A * 10/1993 Ebbers et al. ............... 345/642
5,883,640 A * 3/1999 Hsieh et al. ................. 345/503
6,263,470 B1 * 7/2001 Hung et al. .................. 714/784
6,513,133 B1 * 1/2003 Campbell ..................... 714/38

OTHER PUBLICATIONS

Hsu, Siu Chi et al. "Drawing and Animation using Skeletal Strokes", In Proceedings of ACM SIGGRAPH 94, pp. 109-118, Jun. 1994.
Masuch, Maic. "Speedlines: Depicting Motion in Motionless Pictures." ACM SIGGRAPH 99 Technical Sketch, pp. 1-3, Apr. 1999.

* cited by examiner

*Primary Examiner*—Phu K. Nguyen
(74) *Attorney, Agent, or Firm*—Pillsbury Winthrop Shaw Pittman LLP

(57) ABSTRACT

A method of adding primitives in real time to a model to produce a non-photorealistic rendering (NPR) of a model includes storing attribute data for each one of the primitives. A ring buffer is provided, having at least one stage, for each vertex of the model which is to have a primitive. Within each ring buffer, data is stored representative of a direction of each one of the primitives. Information is retrieved from the ring buffer by using a pointer, wherein the pointer is incremented and iterated over each stage of the ring buffer.

30 Claims, 17 Drawing Sheets

Ring buffer of length $n$ at frame $k$

METHOD AND APPARATUS FOR ADDING REAL-TIME PRIMITIVES

BACKGROUND OF THE INVENTION

1. Field of the Invention

The present invention relates generally to non-photorealistic rendering (NPR) of images, and, more particularly, to a system, method, and apparatus for creating primitives for a 3-dimensional model in real-time.

2. Description of the Related Art

There are embodiments in the art which add primitives such as motion lines to line drawings. For example, motion lines have been added to cartoon animations to give the appearance of motion or to emphasize a particular object's motion in the animation. In such an embodiment, motion lines are typically employed to make the movement of such objects appear as realistic, or "photo-realistic," as possible.

There are other embodiments in which primitives such as motion lines are automatically added to line drawings. In such embodiments, motion lines are added to static scenes at authoring time and then applied and rendered. The direction and other characteristics of each line, such as visibility and perspective correctness, are calculated at the authoring time from attribute information stored for each object to which motion lines are to be drawn for each frame. Such embodiments use key-frame data, where all of the attribute data for each object to which motion lines are to be drawn is stored within a file or memory separately for each frame. Since this attribute information is processed separately for each frame, such an embodiment consumes much of a system's resources.

An embodiment which relies less on a system's resources is therefore desired, so primitives such as motion lines may quickly be added to a frame. It is desirable to have an embodiment capable of processing a series of successive frames in an animation, for example, in which motion lines are not merely calculated from stored attribute information at authoring time for each frame. An improved embodiment would use, in addition to key-frame data, per-frame data, or data relating to the position and movement of an object in an animation based upon the position of the object in previous frames.

It is also desirable to add primitives such as motion lines not only to a line drawing, but also to a 3-dimensional (3-D) model with polygonal geometry. It is desirable for such a system to use both per-frame data and key-frame data. A system using per frame data calculates motion lines based upon the positions of objects to which they attach in previous frames. Thus, physics can be applied to objects in each frame, and motion can be illustrated by resultant motion lines based upon the positions of objects in a series of frames, unlike previous systems, which calculate positions and other physical properties separately for each frame.

An embodiment is desired in which primitives such as motion lines may be added in real time. Therefore, an embodiment in which speed is optimized is desired.

DETAILED DESCRIPTION

The preferred embodiment is a system that takes a 3-dimensional (3-D) model and produces a non-photorealistic rendering (NPR) of the model. Non-realistic effects are added to make a user of the system feel more drawn into the virtual 3-D world. Real-time motion lines are created that follow a 3-D model to give the appearance of motion to an object.

Figure 1A:
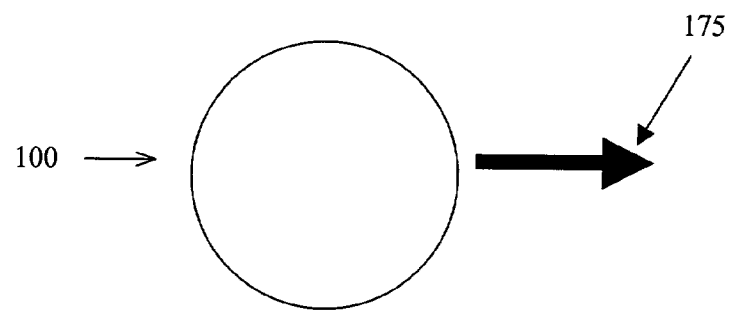
FIG. 1A illustrates a first position of a sphere according to an embodiment of the present invention.
Figure 1B:
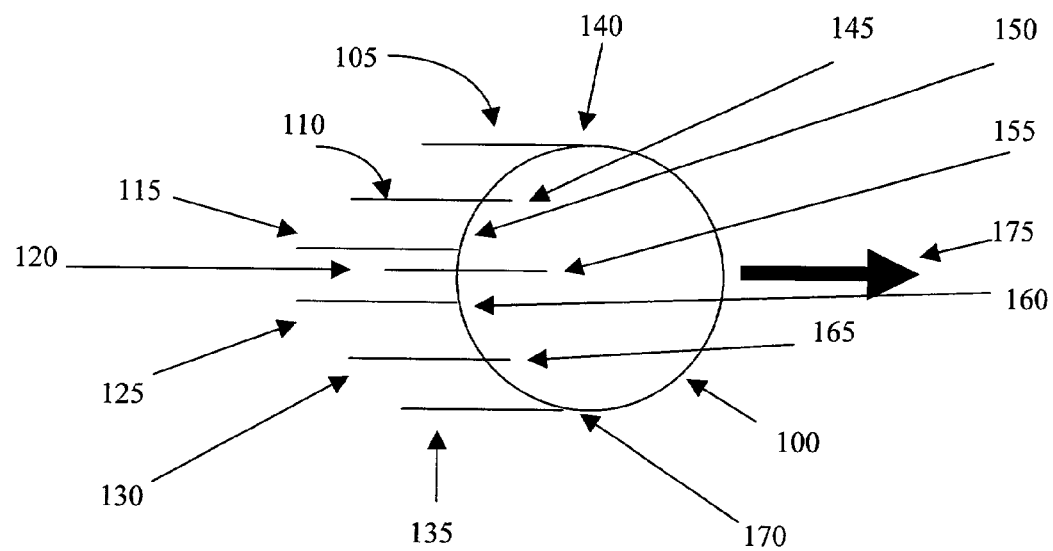
FIG. 1B illustrates a second position of a sphere to which motion lines have been added according to an embodiment of the present invention.

FIG. 1A illustrates a first position of a sphere 100 moving in the direction of the arrow 175 according to an embodiment of the present invention. FIG. 1B illustrates a second position of the sphere 100 moving in the direction of the arrow 175 to which motion lines have been added according to an embodiment of the present invention. FIG. 1B shows the sphere 100 with motion lines 105, 110, 115, 120, 125, 130 and 135 attached thereto. Each motion line 105, 110, 115, 120, 125, 130 and 135 is attached to a vertex 140, 145, 150, 155, 160, 165 and 170, respectively, on the sphere 100. These motion lines 105, 110, 115, 120, 125, 130 and 135 are drawn in to illustrate the motion of the sphere 100. These motion lines are drawn in the opposite direction of the movement of the sphere 100 as shown by the arrow 175. Without the addition of motions lines 105, 110, 115, 120, 125, 130 and 135, the sphere 100 would appear static.

The system according to an embodiment of the present invention keeps track of the movement of various specified points on a designated object from frame to frame and draws primitives for the specified points on the object. Primitives may be polygons such as drawings representing smoke, or motion lines showing movement, for example. The primitives are motion lines, as shown in FIG. 1A, according to a preferred embodiment. The points on the object to which the motion lines are attached are called "vertices." Each motion line is a collection of line segments with associated parameters for properties such as length, width, color, starting vertex position, a visibility flag, etc. A set of motion lines is used to give the appearance of motion in a scene of an animation. The number of motion lines and the length of each motion line can be varied depending on aesthetic preference. A determination is made before run time as to which objects in a scene are to have motion lines attached. In one embodiment, an author may tag objects within a scene on which to attach motion lines. The author may also choose the vertices on the object on which to add the motion lines, or a program may automatically choose the vertices for the author. In another embodiment, each object in a series of frames may be tested to determine whether it has traveled over a threshold velocity for motion lines to be added. In such an embodiment, a program may be used to select the vertices on the object travelling above the threshold velocity.

Figure 2:
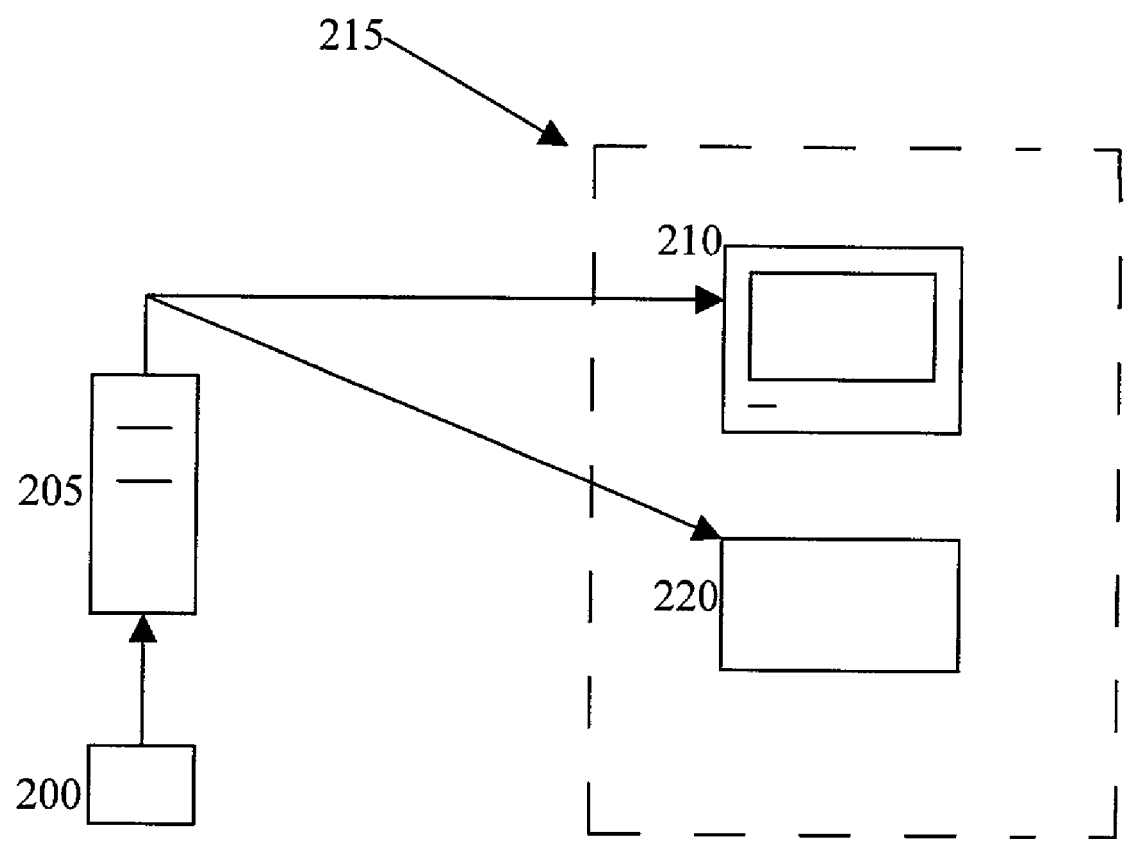
FIG. 2 illustrates an overview of a system according to an embodiment of the present invention.

FIG. 2 illustrates an overview of a system according to an embodiment of the present invention. The system is comprised of three main components: a program code storage device 200, a processing unit 205, and a display unit 215. The program code storage device 200 may be any device capable of storing program code, such as a semiconductor memory or a storage disk device. A function of the program code storage device 200 is to store code for a program that adds motion lines to a scene in one frame in a series of frames. The processing unit 205 may be any device capable of executing program code. The function of the processing unit 205 is to run the program code stored on the program code storage device 200. The display unit 215 may be any device capable of displaying a frame with motion lines, such as a cathode ray tube (CRT) 210 or a printer 220. When a real-time motion line drawing program stored on the program code storage device 200 is run to add motion lines to a series of drawn frames, the display unit 215 has the function of displaying the resultant frames.

Figure 3:
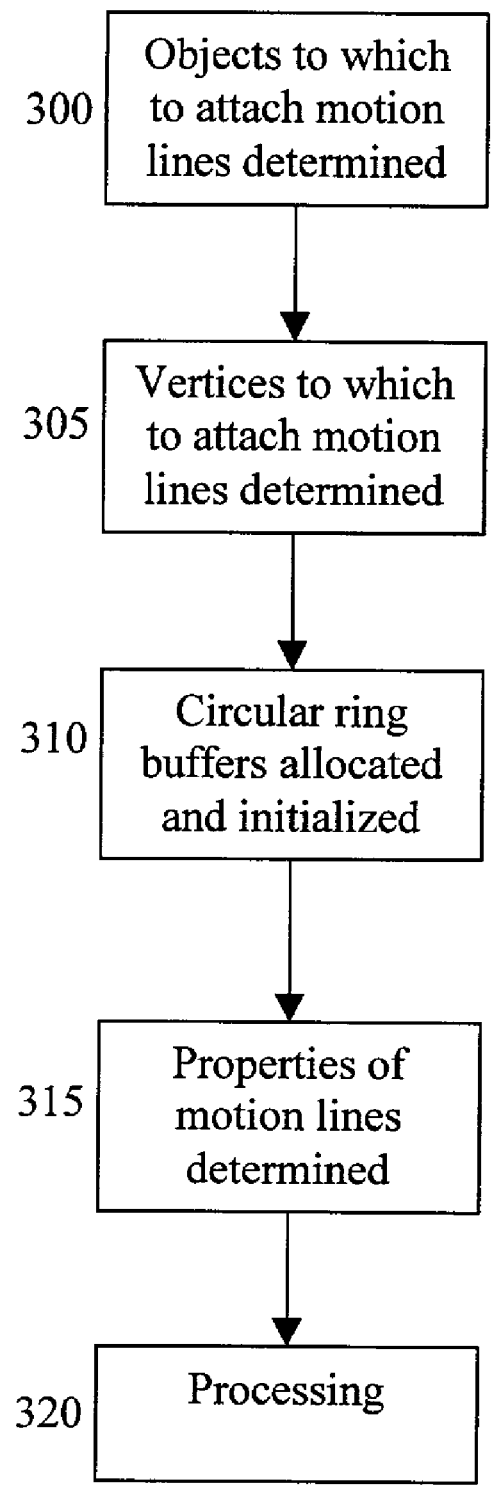
FIG. 3 is a flow chart showing the information determined before real time motion lines are drawn according to an embodiment of the present invention.

Before processing, several determinations must be made. FIG. 3 is a flow chart showing the information determined before real time motion lines are drawn according to an embodiment of the present invention. First, the objects in a scene to which motion lines are to be drawn must be determined 300. Next, the vertices to which motion lines are to be attached on the objects in a scene to which motion lines are to be drawn must be determined 305. A circular ring buffer of a length that is as long as the number of points used to draw a motion line is allocated and initialized 310 for each vertex to which a motion line is to be drawn. The attributes of each motion line to be drawn must then be determined 315. The attributes may included data such as line color, a line width, etc. The system then may begin processing 320, and the motion lines may be drawn for each vertex to which a motion line is to be drawn.

Figure 4A:
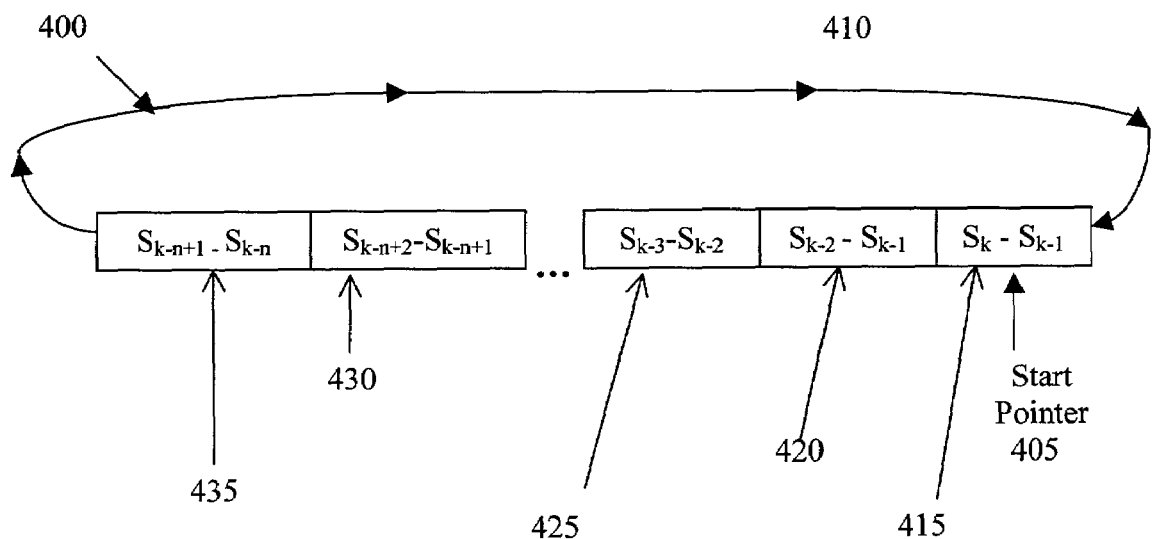
FIG. 4A illustrates a first iteration of a ring buffer span in which data for a vertex to which a motion line is to be added is stored over a three-frame span according to an embodiment of the present invention.
Figure 4B:
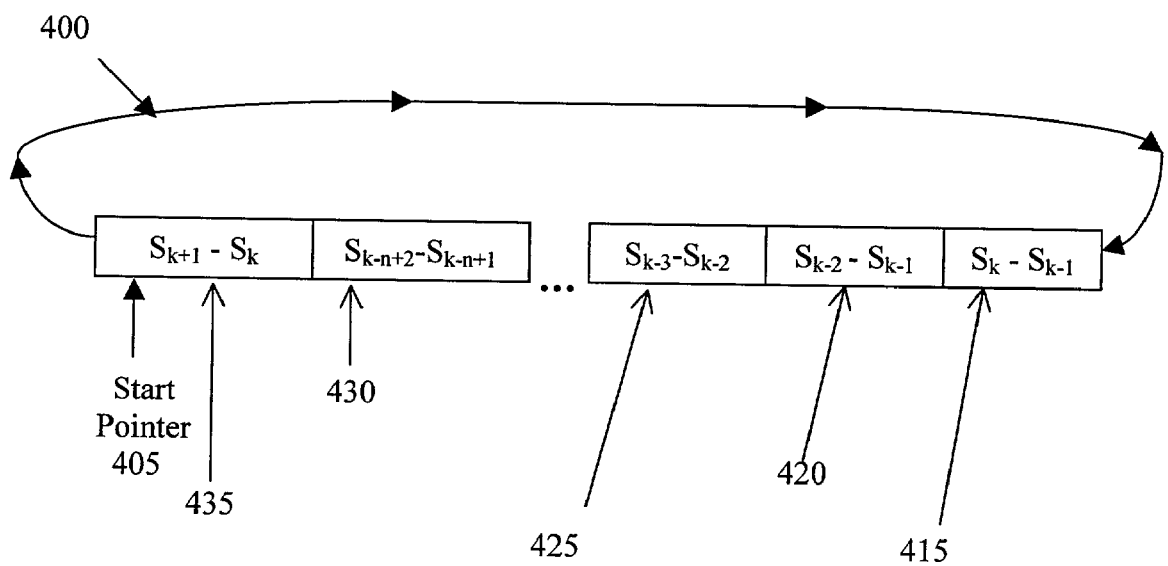
FIG. 4B illustrates a second iteration of a ring buffer span in which data for a vertex to which a motion line is to be added is stored over a three-frame span according to an embodiment of the present invention.
Figure 4C:
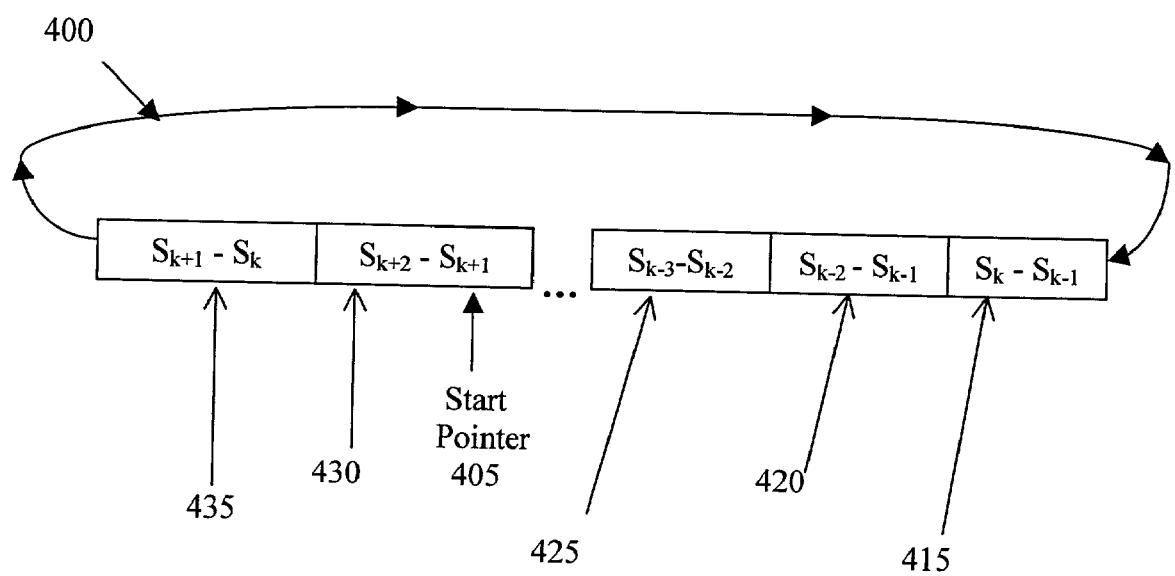
FIG. 4C illustrates a third iteration of a ring buffer span in which data for a vertex to which a motion line is to be added is stored over a three-frame span according to an embodiment of the present invention.

FIG. 4A illustrates a first iteration of a ring buffer 400 span in which data for a vertex to which a motion line is to be added is stored over a three-frame span according to an embodiment of the present invention. FIGS. 4B and 4C illustrate the second and third iterations of the ring buffer span 400. The circular ring buffer 400 is n stages long. The circular ring buffer 400 is used to store the positional change of a vertex, to which a motion line is to be attached, in each of the previous n frames in an embodiment for a series of frames. A pointer 405 is used to retrieve the vertex position data from the circular ring buffer 400. During the first iteration, as shown in FIG. 4A, for a vertex $S_k$ to which motion lines are drawn in frame k, the change in position of the vertex from its position in the previous frame, frame k−1, to frame k, or $S_k-S_{k-1}$, is stored in the starting stage 415. The position change $S_k-S_{k-1}$ is subtracted from $S_k$ and a line segment is drawn between $S_k$ and the resulting difference, which represents the position of the vertex in frame $S_{k-1}$. Next, a similar process is used to draw a line segment is drawn between the vertex position 2 frames earlier ($S_{k-2}$) and the vertex position in the previous frame ($S_{k-1}$). Line segments are also drawn in a similar manner between each of the other previous vertex positions ($S_{k-3} \rightarrow S_{k-n}$) stored in the segments of the ring buffer 400.

Each stage of the ring buffer 400 holds a translation vector representative of the direction of a vertex in the previous frame. The translation vectors are used to draw motion lines. When the motion line for the vertex at $S_k$ has been completed, the frame is incremented to k+1, and the difference between the positions of the vertex in the current frame k+1 and the vertex position in the previous frame, k, or $S_{k+1}-S_k$, replaces the data $S_{k-n+1}-S_{k-n}$, which was the last point on the motion line for the vertex $S_k$ in frame k, and was stored in the last stage of the ring buffer for the previous iteration shown in FIG. 4A. A similar process is used to draw all other segments of the motion line for the vertex position $S_{k+1}$. In the iteration shown in FIG. 4B, the start pointer begins retrieving data from the stage 435 containing the difference between $S_{k+1}$ and $S_k$. A similar process is repeated for each vertex to which a motion line is to be added for the third iteration, as shown in FIG. 4C, and for every iteration thereafter.

The system can attach motion lines of length n after the nth frame in a series of frames has been reached. For example, where n=20, the system can wait until the 21st frame to attach motion lines. Alternatively, the system may attach motion lines of a smaller length before the nth frame is reached. For example, where n=20, a NULL character representing no data for a segment of a motion line can initially be stored as the translation vector for every stage of the ring buffer 400. At the first stage, the ring buffer would be used to draw a motion line of length zero to a vertex S. In the second frame, the difference between $S_2$ and $S_1$ would replace one of the NULL data stored in a stage of the ring buffer, and this data would be used to draw a motion line between the current vertex position, $S_2$, and the previous vertex position, $S_1$. A similar process would be repeated for every frame thereafter. The motion lines would become one segment longer for every frame up until the 21st frame, where the motion line would be 20 segments long, and remain that segment length for every frame thereafter.

This system may also attach motion lines of segment length n before the nth frame in a series of frames has been reach if data for frames before the first frame in a series of frames is stored in the ring buffer before processing. During processing, similar iterations are performed on the ring buffer, as are in a frame after the nth frame in a series of frames.

Figure 5:
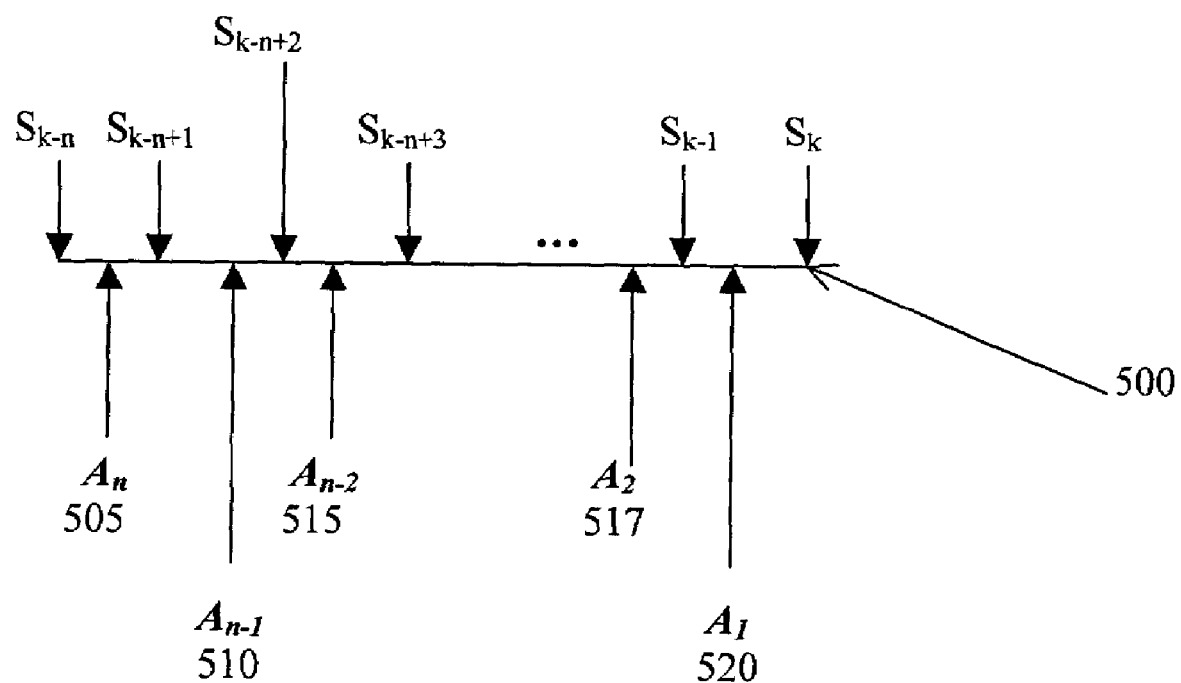
FIG. 5 illustrates a motion line and each of the line segments comprising the motion line according to an embodiment of the present invention.

FIG. 5 illustrates a motion line and each of the line segments comprising the motion line according to an embodiment of the present invention. The motion line 500 is created for the vertex point S from the positions of S in the previous n frames. At frame k, where k>n, $S_k$ is the current position of the vertex, and $S_{k-1}$–$S_{k-n}$ are the previous n positions of S. A line segment is drawn between each of these points. These line segments comprise the motion line. Attribute data for each segment of the line is preferably stored in an array. The attribute data can be data such as the width, color, and a visibility flag, etc., for each segment of the motion line. Where it is desirable for the portion of the motion line closest to the object whose motion is being illustrated to be dark, the array can be set to make those portions darker, and make the portions of the motion line furthest away lighter, thus creating the appearance that the motion lines fade as they extend further away from the object to which they are attached. This array, unlike the ring buffer containing the vertex positions, can be prestored with information before processing so that it does not have to acquire any further information from each frame in a series of frames. For example, in FIG. 5, $A_1$ 520 contains attribute data for the first line segment (that drawn between $S_k$ and $S_{k-1}$). $A_2$ 517 contains attribute data for the second line segment (that drawn between $S_{k-1}$ and $S_{k-2}$). Similarly, $A_n$ 505 contains attribute data for the nth line segment (that drawn between $S_{k-n+1}$ and $S_{k-n}$). Also, $A_{n-1}$ 510 contains attribute data for the n-1th line segment (that drawn between $S_{k-n+2}$ and $S_{k-n+1}$). $A_{n-2}$ 515 contains attribute data for the n-2th line segment (that drawn between $S_{k-n+3}$ and $S_{k-n+2}$). This array can always draw each line segment the same way for a vertex in each of a series of frames. In other words, in the jth frame, $A_1$ 520 may contain the segment attribute data for the first line segment of a motion line drawn between vertex point $S_j$ and a previous vertex point $S_{j-1}$. In the j+1th frame, $A_1$ 520 may still contain the segment attribute data for the first line segment of a motion line drawn for the same vertex, this time the segment between the points $S_{j+1}$ and $S_j$. A similar scheme may be used for all of the segments.

In the preferred embodiment, all of the processing occurs at run-time, thereby resulting in the motion lines being added in real-time. This method of rendering by using the positions of the vertex from previous frames allows the physics of an object in motion to be more clearly illustrated. For example, if it is necessary to show an object moving in a zig-zag direction, or moving in a circular direction, this system may show the motion lines based on the aforementioned previous vertex positions to clearly show the physics of the object in motion. Moreover, an object that is changing directions and undergoing a change in speed can also be clearly shown.

Figure 6:
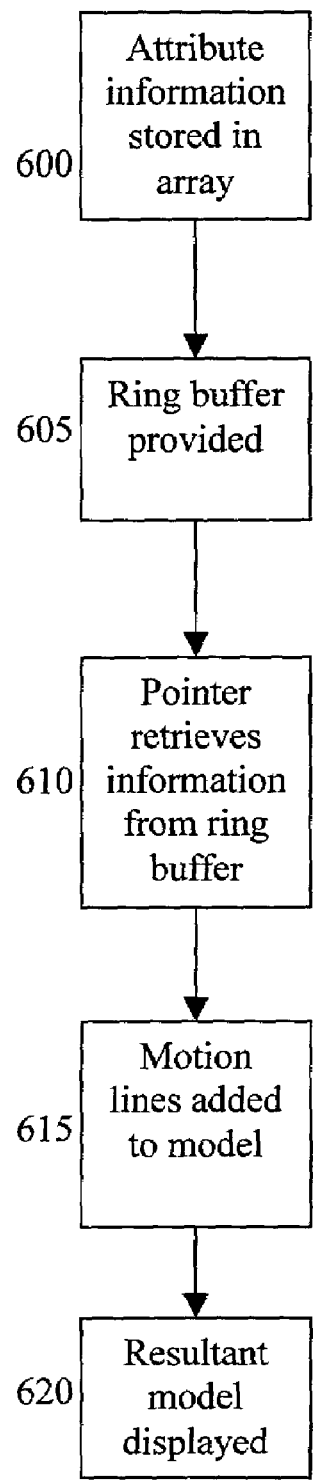
FIG. 6 illustrates a process of adding motion lines to a drawing according to an embodiment of the present invention.

FIG. 6 illustrates a process of adding motion lines to a drawing according to an embodiment of the present invention. First, attribute information for the motion line to be drawn is stored 600 in an array. This attribute information is information such as the previous vertex positions for a vertex to which a motion line is to be drawn, line thickness, color, etc. Next, a ring buffer is provided 605 in which this data for the previous positions of a vertex to which a motion line is to be attached is stored. A pointer is then used to retrieve 610 the position data from the ring buffer. Next, the motion lines are added 615 in real time to vertices to which they correspond, and the resultant model is displayed 620.

Figure 7:
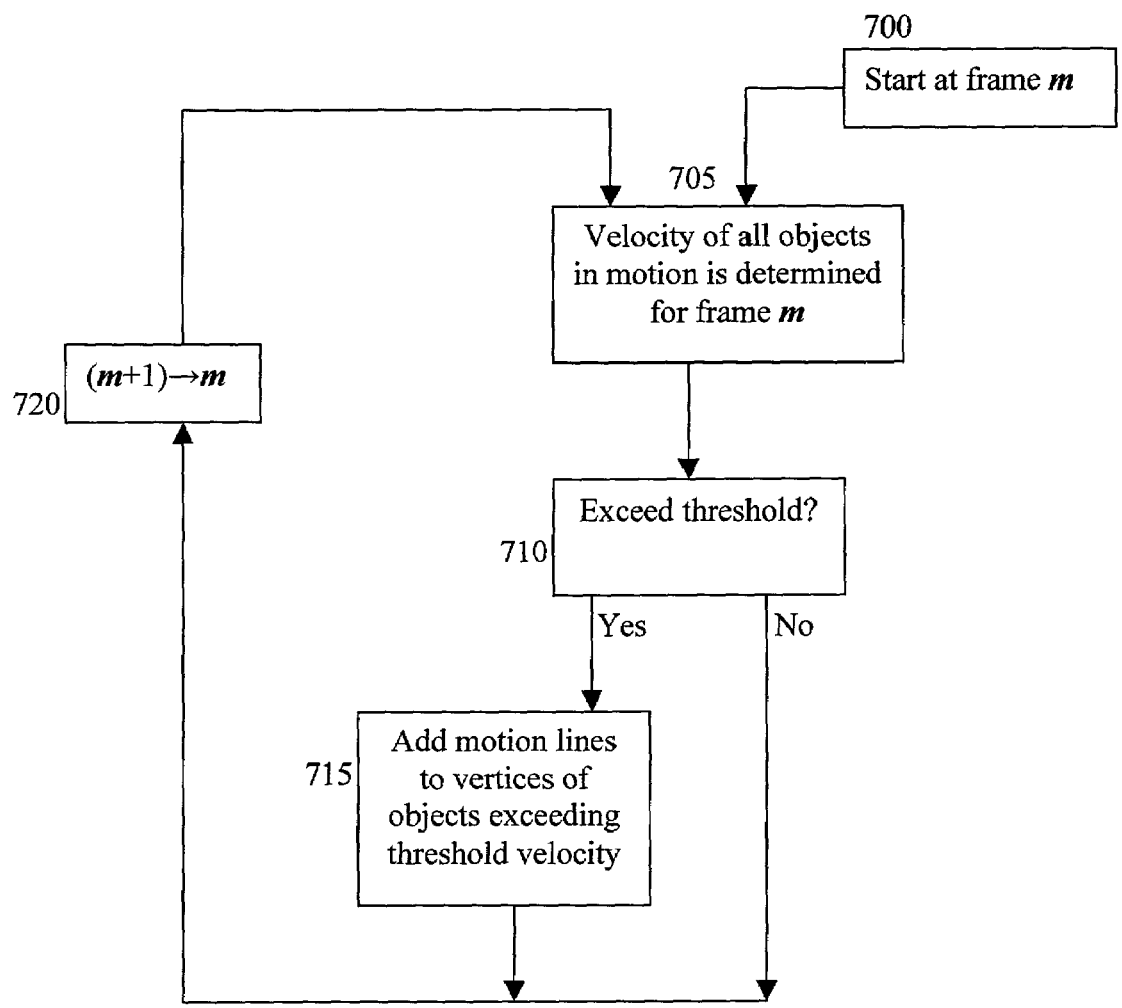
FIG. 7 illustrates a process by which motion lines are automatically added to objects exceeding a threshold velocity in a frame of a series of frames according to an embodiment of the present invention.

An author may select objects in a frame in a series of frames to which motion lines are to be attached. Alternatively, a program may be utilized to select objects to which to attach motion lines. Such a program may select an object to which to attach motion lines based on criteria such as the object's relative velocity or acceleration. FIG. 7 illustrates a process by which motion lines are automatically added to objects exceeding a threshold velocity in a frame of a series of frames according to an embodiment of the present invention. First, the starting frame must be selected. Frame m, for example, may be the starting frame 700. Next, the velocity of all objects in motion in frame m is determined 705 by the relative change of position of each object based upon each of their positions in previous frames. Next, the program determines 710 whether any of the objects in motion exceed a predetermined threshold velocity. For all objects exceeding the threshold, motion lines are attached 715 to those objects' vertices. Next, the frame counter is incremented 720 so that during the next iteration, the frame is m+1. The process then repeats for frame m+1, beginning with the velocity determination 705. A similar process is used for all successive iterations.

Figure 8:
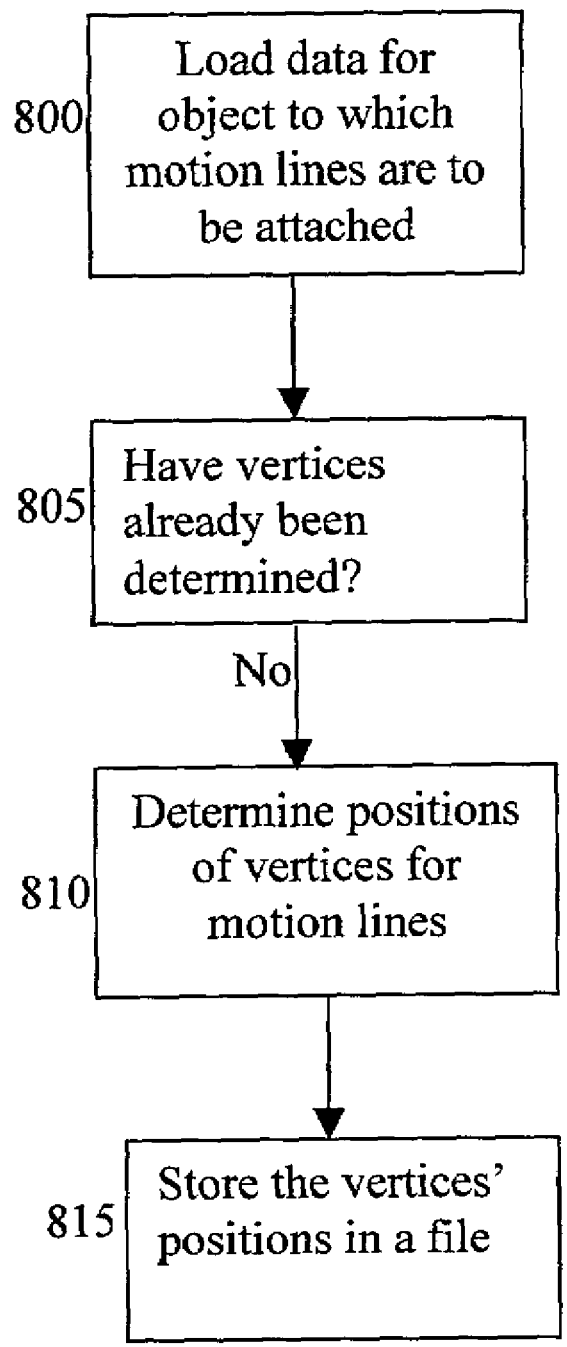
FIG. 8 illustrates a process by which vertices are automatically determined by a process according to an embodiment of the present invention.

The author may select the vertices to which motion lines are to be attached before processing, or a program can determine them. FIG. 8 illustrates a process by which vertices are automatically determined by a process according to an embodiment of the present invention. First, data for an object to which motion lines are to be attached is loaded 800. This data may contain information such as the location of the object in the frame, as well as the shape of the object. Next, the program determines whether vertices have already been determined 805 for the object. This determination prevents the program from adding motion lines to different vertices of an object throughout a series of frames. If the vertices have not been determined, the program then determines 810 the best vertices on the object to which to attach the motion lines. The vertices' positions are then stored 815 in a file.

Figure 9A:
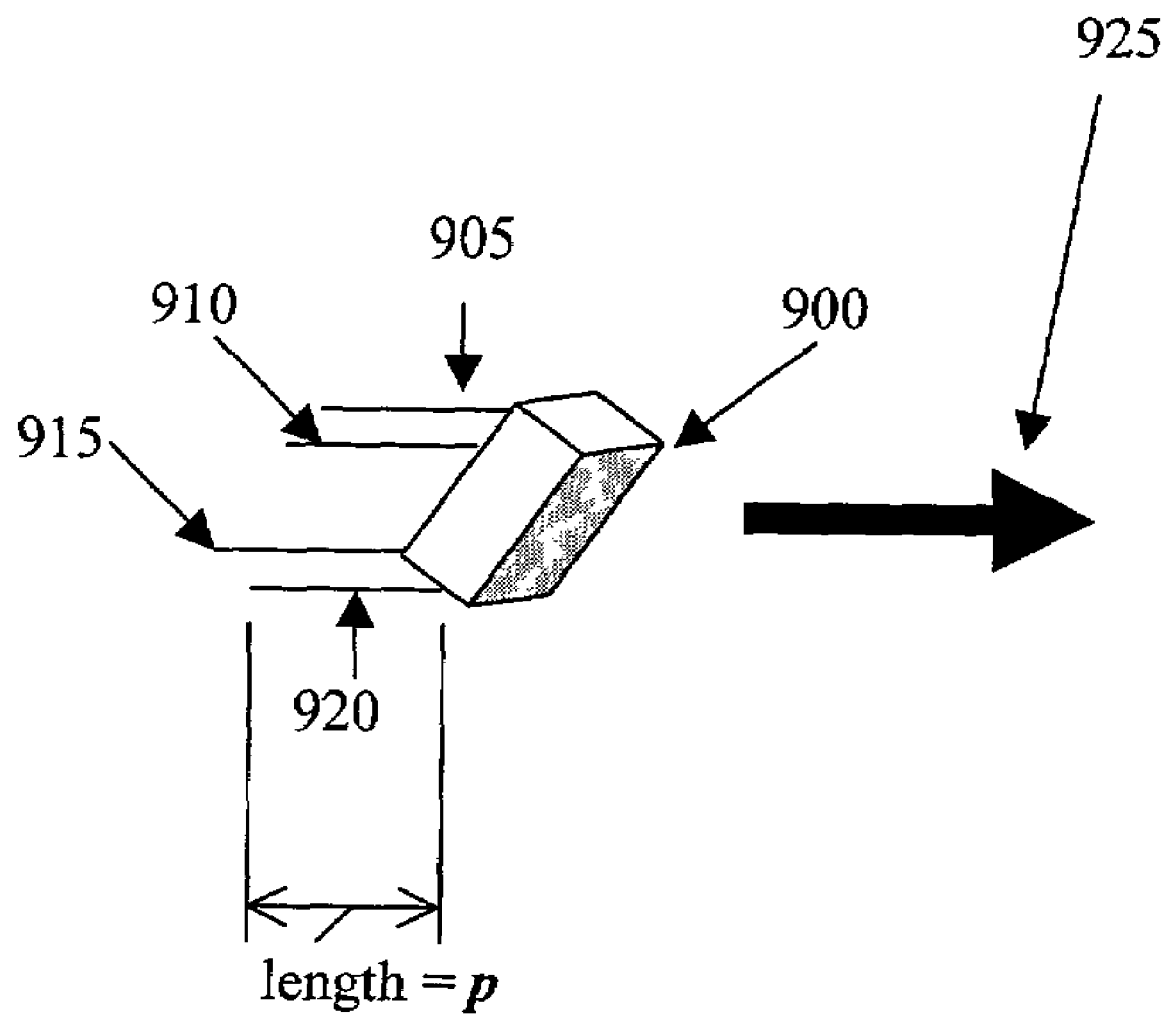
FIG. 9A illustrates a solid box-shaped object, travelling at a first constant velocity, to which parallel motion lines have been drawn, according to an embodiment of the present invention.

FIG. 9A illustrates a solid box 900 travelling at a first constant velocity in the direction of the arrow 925, to which parallel motion lines 905, 910, 915, and 920 have been drawn according to an embodiment of the present invention. This motion is evidenced by the direction of the motion lines 905, 910, 915, and 920. The vertices of the box 900 are moving in a uniform direction, with each vertex moving in the same direction at the same speed, as is illustrated by virtue of the fact that the motion lines 905, 910, 915, and 920 are parallel to each other and are all the same length. Data from the positions of the vertices in the previous n frames is used to drawn the motion lines 905, 910, 915, and 920. The length of each of each of these uniform motion lines is p.

Figure 9B:
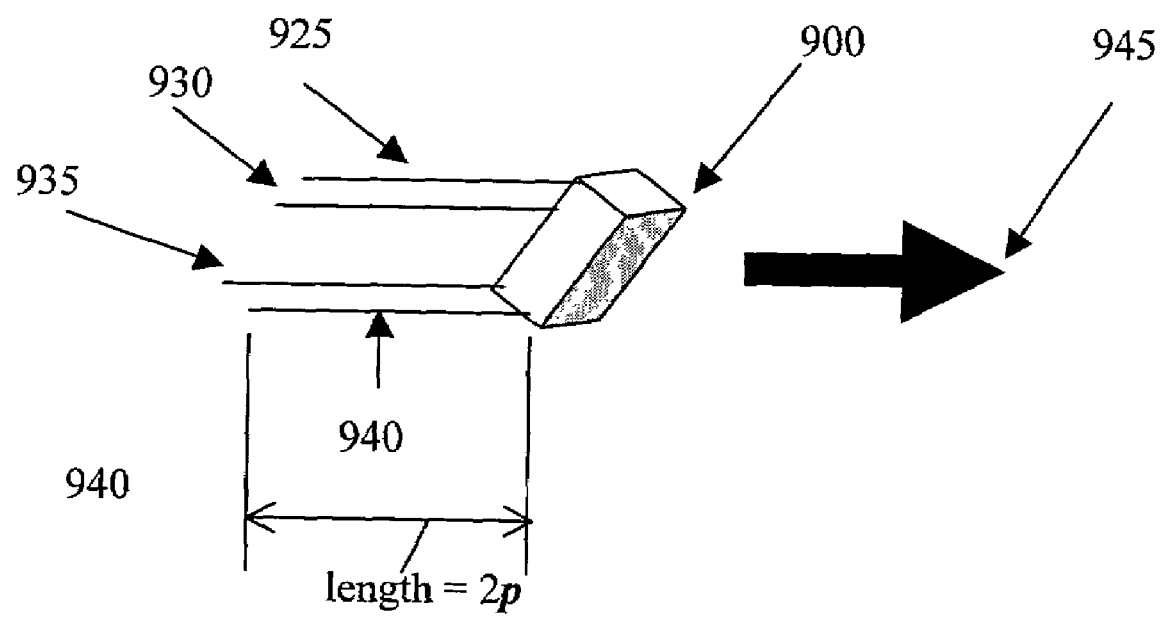
FIG. 9B illustrates a solid box-shaped object, travelling at a second constant velocity, to which parallel motion lines have been drawn, according to an embodiment of the present invention.

FIG. 9B illustrates the solid box 900 travelling at a second constant velocity, equal to twice that of the first velocity of the box 900 in FIG. 9A, in the direction of the arrow 945, to which parallel motion lines 925, 930, 935, and 940 have been drawn according to an embodiment of the present invention. The vertices of the box 900 are moving in a uniform direction, with each vertex moving in the same direction at the same speed, as is illustrated by virtue of the fact that the motion lines 925, 930, 935, and 940 are parallel to each other and are all the same length. Data from the positions of the vertices in the previous n frames is used to draw the motion lines 925, 930, 935, and 940. The length of each of these uniform motion lines is 2p, which is twice as long as the motion lines 905, 910, 915, and 920 in FIG. 9A, since the constant velocity of the box 900 in FIG. 9B is twice that of the constant velocity of the box in FIG. 9A.

Figure 9C:
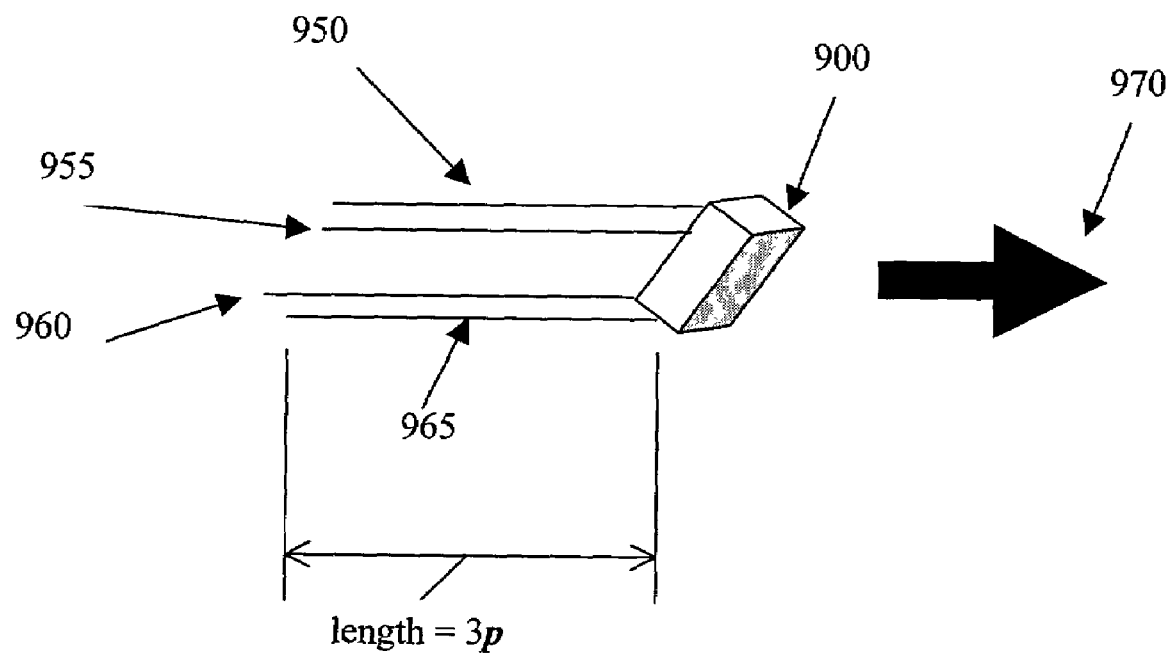
FIG. 9C illustrates a solid box-shaped object, travelling at a third constant velocity, to which parallel motion lines have been drawn, according to an embodiment of the present invention.

FIG. 9C illustrates the solid box 900 travelling at a second constant velocity, equal to thrice that of the first velocity of the box 900 in FIG. 9A, in the direction of the arrow 970, to which parallel motion lines 950, 955, 960, and 965 have been drawn according to an embodiment of the present invention. The vertices of the box 900 are moving in a uniform direction, with each vertex moving in the same direction at the same speed, as is illustrated by virtue of the fact that the motion lines 950, 955, 960, and 965 are parallel to each other and are all the same length. Data from the positions of the vertices in the previous n frames is used to draw the motion lines 950, 955, 960, and 965. The length of each of these uniform motion lines is 3p, which is thrice as long as the motion lines 905, 910, 915, and 920 in FIG. 9A, since the constant velocity of the box 900 in FIG. 9B is thrice that of the constant velocity of the box in FIG. 9A.

Figure 10A:
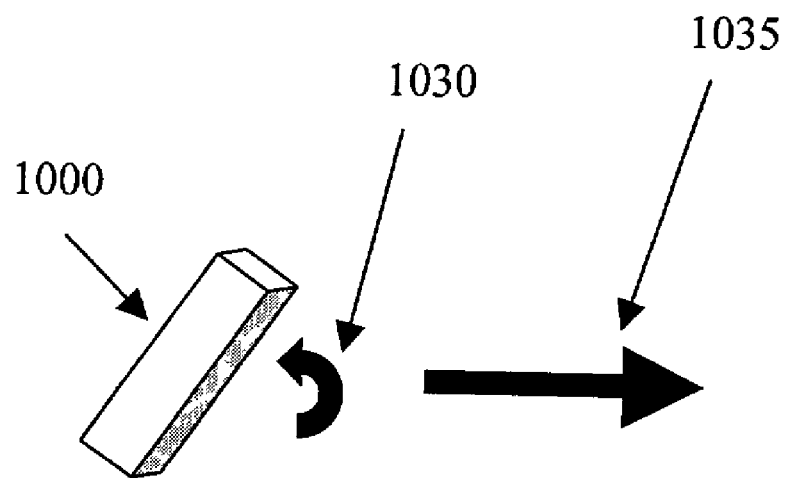
FIG. 10A illustrates a first position of a solid box-shaped object according to an embodiment of the present invention.
Figure 10B:
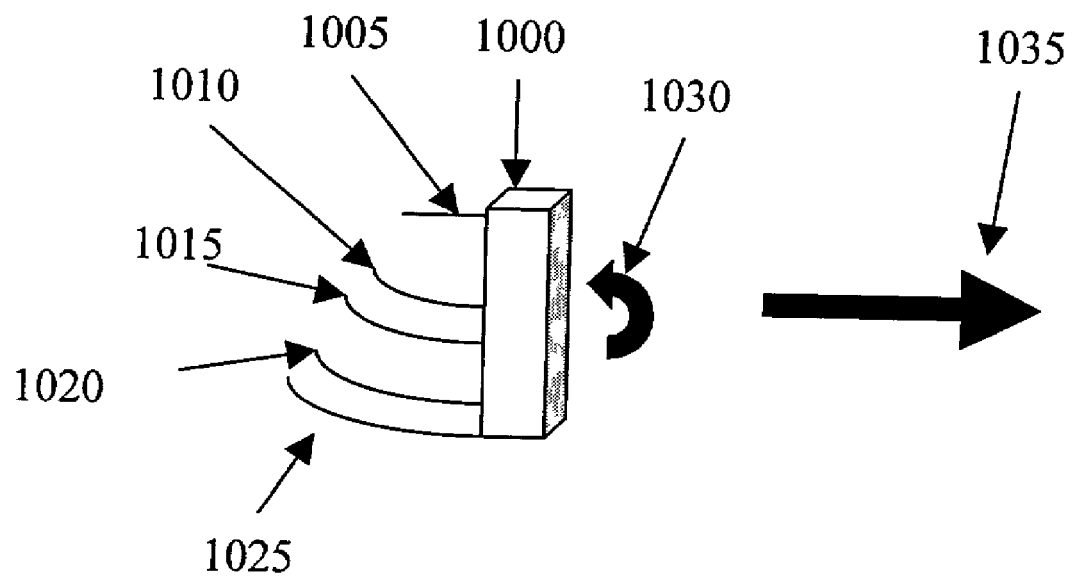
FIG. 10B illustrates a second position of a solid box-shaped object which is moving away from its first position and experiencing a positive angular velocity in a counter-clockwise direction, to which motion lines have been drawn according to an embodiment of the present invention.

FIG. 10A illustrates a first position of a solid box-shaped object according to an embodiment of the present invention. This box 1000 is moving in forward (to the right) as indicated by the straight arrow 1035 and rotating in a counterclockwise direction, as indicated by the circular arrow 1030. FIG. 10B illustrates a second position of the solid box-shaped object which is moving away from its first position and experiencing a positive angular velocity in a counter-clockwise direction, to which motion lines 1005, 1010, 1015, 1020, and 1025 have been drawn according to an embodiment of the present invention. The motion lines in FIG. 10B illustrate that the box 1000 is undergoing a horizontal velocity as well as an angular velocity in a counter-clockwise direction. The bottom motion line 1025 is longer and more curved than the one 1020 above it, which is also longer and more curved than the one above it, and so on. These motion lines 1005, 1010, 1015, 1020, and 1025 serve to illustrate the horizontal and angular velocities. Other types of movements can also be illustrated, such as the movement of a non-rigid object, where each vertex undergoes a different movement, or a situation where multiple objects are moving in different directions at different speeds within a series of frames.

Figure 11A:
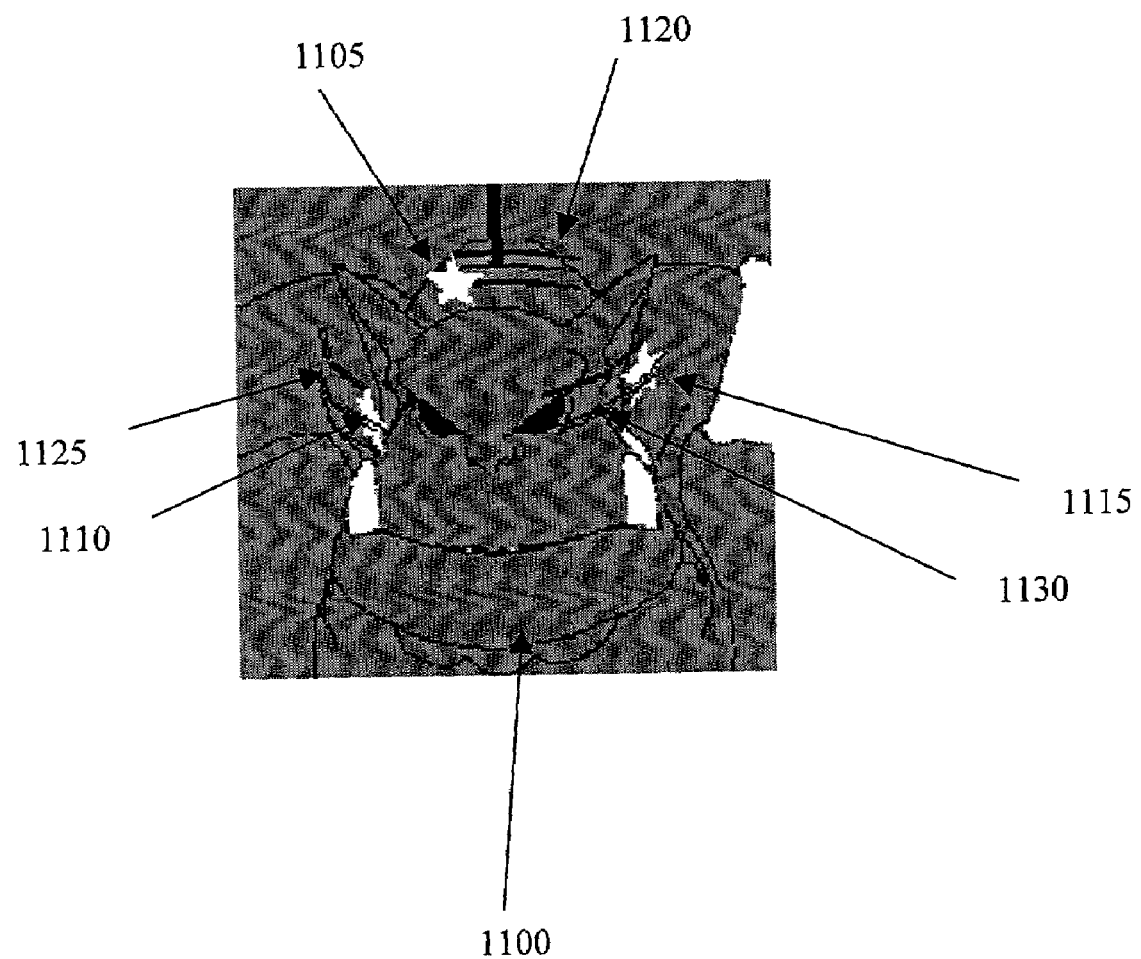
FIG. 11A illustrates a first position of stars with motion lines circling above the head of a monster according to an embodiment of the present invention.
Figure 11B:
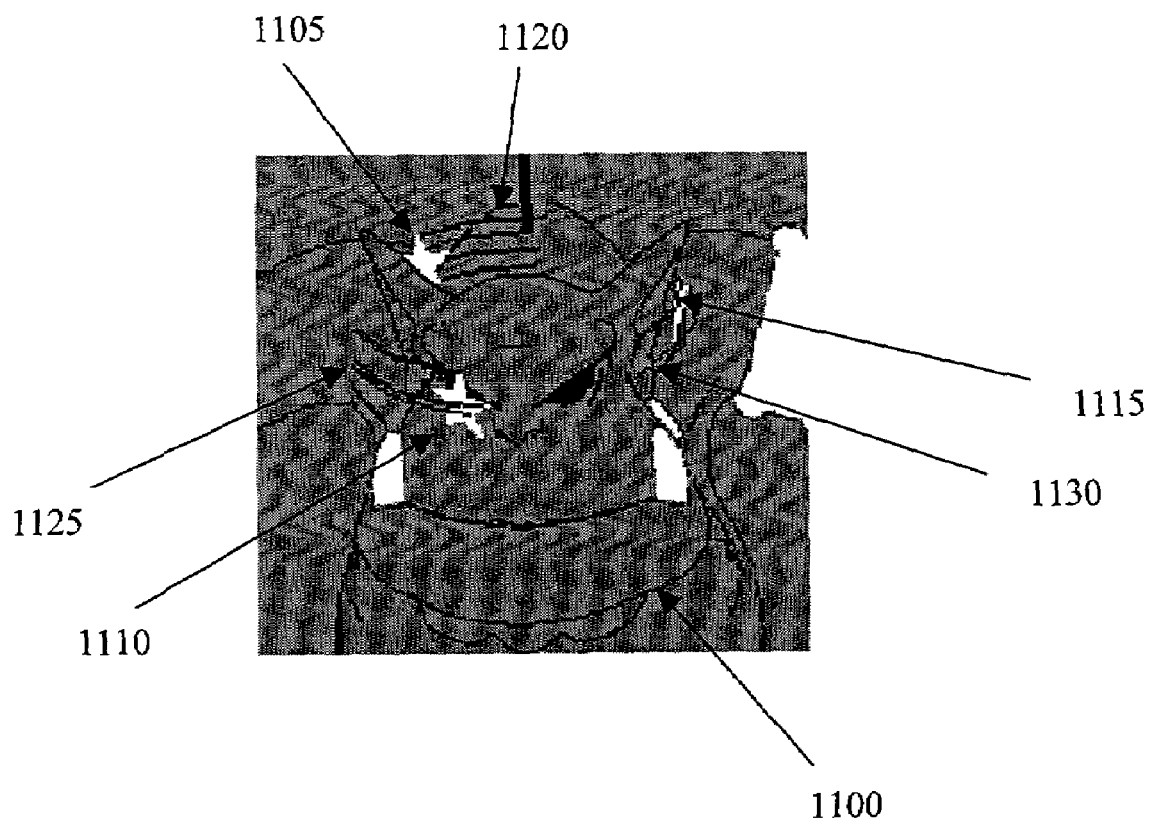
FIG. 11B illustrates a second position of stars with motion lines circling above the head of a monster according to an embodiment of the present invention.
Figure 11C:
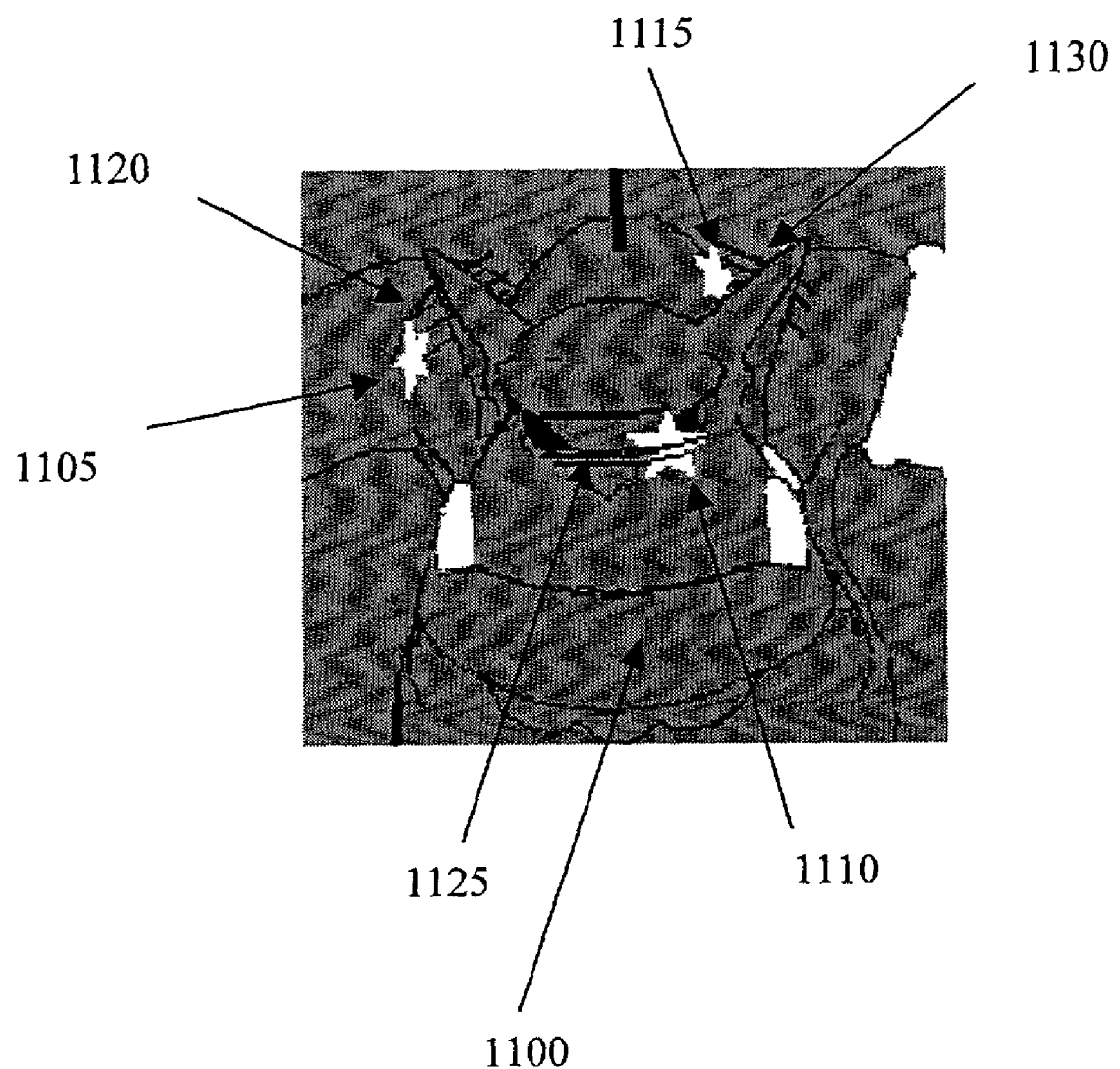
FIG. 11C illustrates a third position of stars with motion lines circling above the head of a monster according to an embodiment of the present invention.

FIGS. 11A–11C illustrate a monster 1100 with stars 1105, 1110 and 1115 flying around his head in a circular manner, relatively parallel to the ground. Motion lines 1120, 1125, and 1130 follow each of the stars 1105, 1110 and 1115 and serve to show the direction of the movement of these stars. In FIG. 11A, a star 1105 is circling the monster's 1100 head, as evidenced by the accompanying motion lines 1120. The star 1105 is directly over the back of the monster's 1100 head. In FIG. 11B, the star 1105 has continued moving in its circular path, and now is behind the monster's 1100 right ear. The accompanying motion lines 1120 have also moved and track the previous path of the vertices on the star 1105 to which they are attached. In FIG. 11C, the star 1105 has continued in its circular trajectory and has passed around the monster's 1100 right ear. The motion lines 1120 also track the movement of the star 1105.

The star 1110 that is located below the monster's 1100 right ear in FIG. 11A has its own accompanying motion lines 1125. Another star 1115 is located below and to the left of the monster's 1100 left ear in FIG. 11A. The star 1115 also has its own accompanying motion lines 1130. These stars 1110 and 1115 undergo similar movements as the star 1105 that began its circular path in FIG. 11A above the back of the monster's 1100 head.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of adding primitives in real time to a model to produce a non-photorealistic rendering (NPR) of the model, comprising:
   storing attribute data for each one of the primitives;
   providing a ring buffer, having at least one stage, for each vertex of the model which is to have a primitive, wherein
   within each ring buffer, data is stored representative of a direction of each one of the primitives; and
   retrieving information from the ring buffer by using a pointer, wherein the pointer is incremented and iterated over each stage of the ring buffer.

2. The method of claim 1, wherein the data stored in the ring buffer for each vertex includes information concerning the change in position of each vertex from frame to frame.

3. The method of claim 1, wherein a program selects vertices from the model to which to attach the primitives.

4. The method of claim 1, wherein the attribute information includes at least one of: a width, a color, a starting vertex position, and a visibility flag for each primitive.

5. The method of claim 1, wherein each ring buffer for each vertex has a set length.

6. The method of claim 1, wherein the attribute information is stored within the ring buffer for each vertex.

7. The method of claim 1, wherein the model is a 3-dimensional model.

8. The method of claim 1, wherein the primitives are at least one of polygons and motion line segments.

9. A real-time primitive drawing system, comprising:
   a storage device for storing attribute data for at least one primitive to be added to a model;
   a ring buffer, having at least one stage, for each vertex of the model to which to attach a primitive, wherein
   within each ring buffer, data is stored representative of a direction of each one of the primitives; and
   wherein
   a pointer is used to retrieve information from the ring buffer, wherein the pointer is incremented and iterated over each stage of the ring buffer.

10. The system of claim 9, wherein the data stored in the ring buffer for each vertex includes information concerning the change in position of each vertex from frame to frame.

11. The system of claim 9, wherein a program selects vertices from the model to which to attach each primitive.

12. The system of claim 9, wherein the attribute information includes at least one of: a width, a color, a starting vertex position, and a visibility flag for each primitive.

13. The system of claim 9, wherein each ring buffer for each vertex has a set length.

14. The system of claim 9, wherein the attribute information is stored within the ring buffer for each vertex.

15. The system of claim 9, wherein the model is a 3-dimensional model.

16. The system of claim 9, wherein the primitives are at least one of polygons and motion line segments.

17. A computer-readable medium having encoded thereon a computer-readable program code which when executed causes a computer to:
- store attribute data for at least one motion line to be added to a model;
- read from and write to a ring buffer, having at least one stage, for each vertex of the model to which to attach a primitive,
- wherein within each ring buffer, data is stored representative of a direction of each one of the primitives; and
- use a pointer to retrieve information from the ring buffer, wherein the pointer is incremented and iterated over all segments of the ring buffer.

18. The computer-readable medium of claim 17, wherein the data stored in the ring buffer for each vertex includes information concerning the change in position of each vertex from frame to frame.

19. The computer-readable medium of claim 17, wherein the computer-readable program code when executed further causes the computer to select vertices from the model to which to attach the motion lines.

20. The computer-readable medium of claim 17, wherein each ring buffer for each vertex has a set length.

21. The computer-readable medium of claim 17, wherein the attribute information is stored within the ring buffer for each vertex.

22. The computer-readable medium of claim 17, wherein the model is a 3-dimensional model.

23. The computer-readable medium of claim 17, wherein the primitives are at least one of polygons and motion line segments.

24. An apparatus for adding primitives in real time to a model, comprising:
- a storage device for storing attribute data for at least one primitive to be added to a model;
- a ring buffer, having at least one stage, for each vertex of the model to which to attach a primitive, wherein
  - within each ring buffer, data is stored including a direction of each one of the primitives; and
- a pointer for retrieving information from the ring buffer, wherein the pointer is incremented and iterated over each stage of the ring buffer, an apparatus on which the resultant primitives are rendered and displayed.

25. The apparatus of claim 24, wherein the data stored in the ring buffer for each vertex includes information concerning the change in position of each vertex from frame to frame.

26. The apparatus of claim 24, wherein a program selects vertices from the model to which to attach the primitives.

27. The apparatus of claim 24, wherein each ring buffer for each vertex has a set length.

28. The apparatus of claim 24, wherein the attribute information is stored within the ring buffer for each vertex.

29. The apparatus of claim 24, wherein the model is a 3-dimensional model.

30. The apparatus of claim 24, wherein the primitives are at least one of polygons and motion line segments.

* * * * *